(12) United States Patent
Sugano (10) Patent No.: US 6,657,808 B1
(45) Date of Patent: Dec. 2, 2003

(54) SENSING SYSTEM WITH CONTINUOUS AND PULSED MODES

(75) Inventor: Tetsuo Sugano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/474,806

(22) Filed: Dec. 29, 1999

(30) Foreign Application Priority Data

Feb. 12, 1999 (JP) .......................................... 11-033999

(51) Int. Cl.[7] .............................................. G11B 15/48
(52) U.S. Cl. ........................................ 360/74.6; 360/69
(58) Field of Search ................................. 360/74.6, 69

(56) References Cited

U.S. PATENT DOCUMENTS

| 4,616,274 A | * | 10/1986 | Nagaoka ..................... 360/71 |
| 4,639,606 A | | 1/1987 | Boles et al. ................. 250/555 |
| 4,876,456 A | * | 10/1989 | Isono et al. ................. 250/561 |
| 5,260,554 A | | 11/1993 | Grodevant ............. 235/462.31 |
| 5,365,383 A | * | 11/1994 | Miller et al. .................. 360/69 |

FOREIGN PATENT DOCUMENTS

| EP | 0487318 A2 | 5/1992 |
| EP | 0490498 A1 | 6/1992 |
| EP | 0548451 A2 | 6/1993 |
| GB | 2136626 A | 9/1984 |
| JP | 240597 | 10/1990 |

* cited by examiner

*Primary Examiner*—David Hudspeth
*Assistant Examiner*—Mitchell Slavitt
(74) *Attorney, Agent, or Firm*—Birch, Stewart, Kolasch & Birch, LLP

(57) ABSTRACT

A sensing system, used to sense the presence of an object in an apparatus operating in different modes, has a light-emitting element and a light-sensing element. The light-emitting element is driven continuously in one of the operating modes, for quick sensing of the object, and is pulsed in another of the operating modes, to reduce power dissipation by the sensor system.

19 Claims, 11 Drawing Sheets

SENSING SYSTEM WITH CONTINUOUS AND PULSED MODES

BACKGROUND OF THE INVENTION

The present invention relates to an optical sensing system used in a device such as a video cassette recorder or deck having multiple operating modes.

Figure 1:
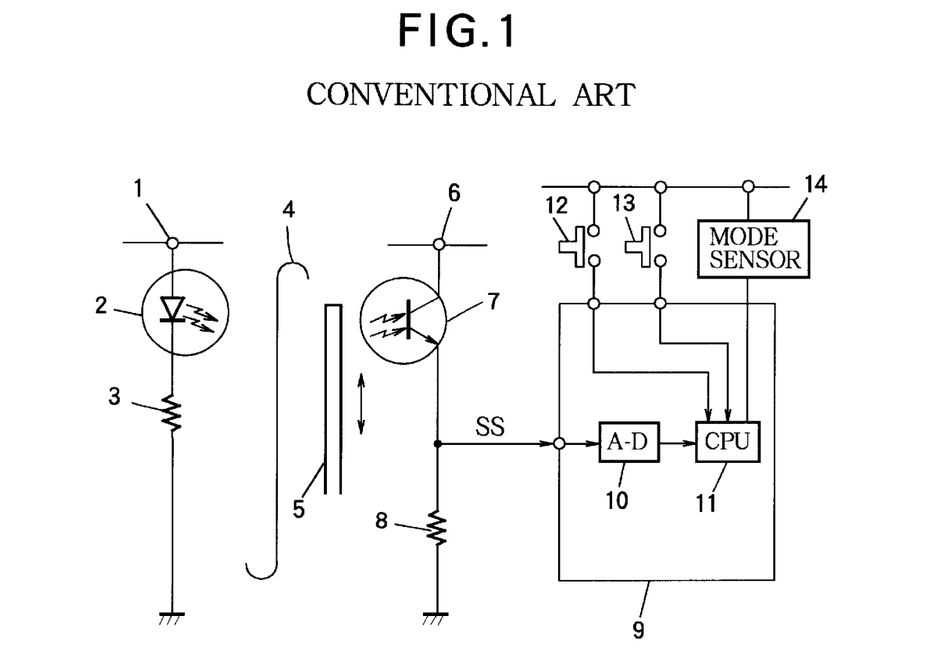
FIG. 1 illustrates components of a video cassette recorder with a conventional sensor system for sensing the presence of magnetic tape.

FIG. 1 illustrates a conventional sensing system used in a video cassette recorder. The system comprises a power supply node 1 coupled to the anode of an infrared light-emitting diode (IR-LED) 2. The cathode of the IR-LED 2 is coupled through a resistor 3 to ground. The IR-LED 2 emits light toward a space through which a magnetic tape 4 travels when the video cassette recorder is operating. If not blocked by the magnetic tape 4, the light passes through a slit referred to as the start-sensor slit 5. On the far side of the slit, another power-supply node 6 is coupled to the collector of an infrared phototransistor 7, the emitter of which is coupled through another resistor 8 to ground. The voltage at the emitter electrode of the infrared phototransistor 7 is supplied as a sensor signal (SS) to a microcomputer 9 comprising an analog-to-digital converter (A-D) 10 and a central processing unit (CPU) 11. The microcomputer 9 also receives inputs from a power on-off switch 12, a rewind switch 13, and a deck mode sensor 14. The deck mode sensor 14 senses the operating mode of the video cassette recorder. The video cassette recorder has various operating modes, including play, fast-forward, rewind, and stop. The signal from the deck mode sensor 14 indicates whether the magnetic tape 4 is moving or stopped.

Figure 2:
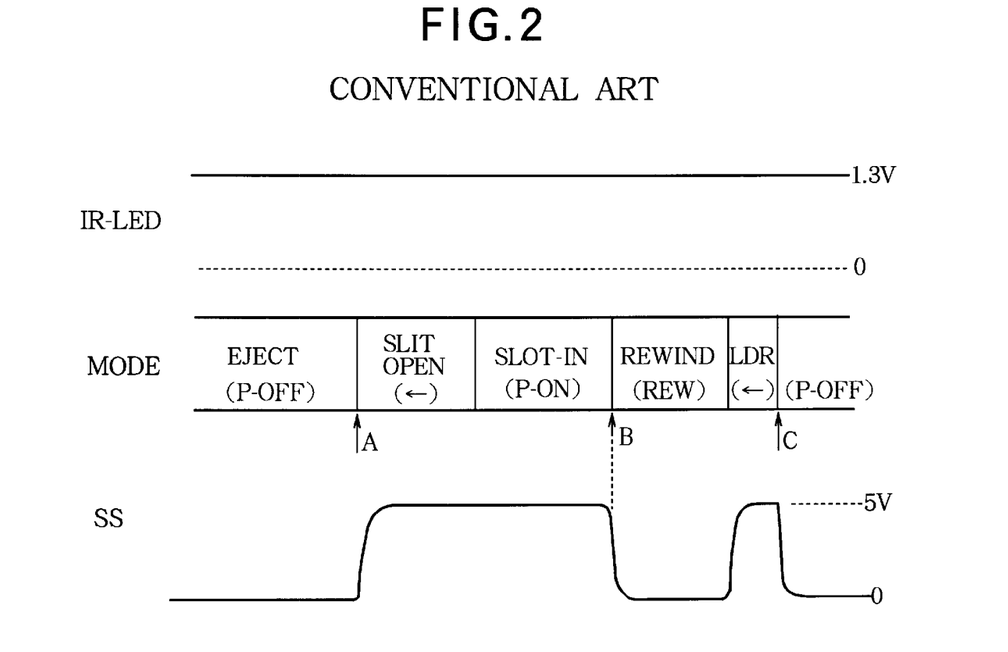
FIG. 2 illustrates the operation of the conventional sensor system.

The sensor system in FIG. 1 operates as a start sensor, enabling the video cassette recorder to start operating automatically when a cassette is inserted. FIG. 2 illustrates a sequence of operations and the accompanying electrical input to the IR-LED 2 and electrical output (SS) of the infrared phototransistor 7. Mechanical modes and operations are indicated between the IR-LED and SS waveforms, with logical and electrical modes indicated in parentheses.

Initially, power is off (P-OFF) and no cassette is present. Even in this power-off mode, power (1.3 V) is supplied to the IR-LED 2, which emits infrared light continuously. Since no cassette is present, the cassette handling mechanism (not shown in the drawings) is in the eject position. This mechanism is linked to the start-sensor slit 5. In the eject position, the start-sensor slit 5 is closed, so the infrared phototransistor 7 does not receive the infrared light emitted by the IR-LED 2. Accordingly, the infrared phototransistor 7 does not conduct, and the sensor signal SS is at the ground level (0 V). In the microcomputer 9, which also continues to receive-power in the power-off mode, the analog-to-digital converter 10 converts the sensor signal SS to a digital value, which is read by the CPU 11.

At a time A, the user inserts a cassette, and the cassette-handling mechanism mechanically opens the start-sensor slit 5. The infrared phototransistor 7 now receives the infrared light emitted by the IR-LED 2 and conducts, causing the sensor signal SS to go to a higher level such as five volts (5 V). At first, the video cassette remains in the power-off mode, as indicated by the arrow in parentheses. Shortly after detecting the SS signal transition, however, the microcomputer 9 powers up the other circuits of the video cassette recorder, entering the power-on mode (P-ON), and initiates a slot-in operation that mechanically loads the magnetic tape 4 into position for recording and playing. In this position the magnetic tape 4 is disposed between the IR-LED 2 and start-sensor slit 5, but the magnetic tape 4 begins and ends with a transparent leader section, lacking a magnetic coating. It will be assumed below that the transparent leader section at the end of the magnetic tape 4 is loaded into the position between the IR-LED 2 and start-sensor slit 5, so the infrared phototransistor 7 continues to receive light and the sensor signal SS remains high.

During the slot-in operation, the user presses the rewind switch 13. When the slot-in operation is completed at time B, the microcomputer 9 immediately initiates a rewinding operation (REW), causing the magnetic tape 4 to be rewound by a motor not shown in the drawing. The opaque magnetic tape 4 now blocks the light emitted by the IR-LED 2, and the sensor signal SS goes low. When the transparent leader section (LDR) at the beginning of the magnetic tape 4 reaches the start-sensor slit 5, however, the infrared phototransistor 7 receives the infrared light emitted by the IR-LED 2, and the sensor signal SS goes high again. This signal transition is detected by the analog-to-digital converter 10 and CPU 11 in the microcomputer 9, which reacts by stopping the rewinding operation. To avoid mechanical stress and strain on the cassette, tape, and motor, the sensor system must detect the leader tape quickly and the microcomputer 9 must stop the rewinding operation promptly.

At point C, the user presses the power on-off switch 12 to switch power off. The microcomputer 9 switches off the power supplied to the infrared phototransistor 7, and the sensor signal SS goes low.

As shown in FIG. 2, the IR-LED 2 is left on at all times. As a result, the IR-LED 2 consumes power unnecessarily when the video cassette recorder is not being used. Over the lifetime of the video cassette recorder, much power is dissipated in this way. This power dissipation could be reduced by operating the IR-LED 2 in an intermittent or pulsed manner, but that would lead to undesirable delays in detecting the leader tape in high-speed operations such as fast-forward and rewind.

SUMMARY OF THE INVENTION

An object of the present invention to reduce power dissipation in a sensor system that optically senses the presence of a recording medium, without slowing the response of the sensor system in high-speed operation modes.

The invented sensor system has a light-emitting element, a switching element supplying power to the light-emitting element, and a light-sensing element. The light-sensing element receives the light emitted by the light-emitting element, conditional on the presence of an object, and converts the received light to an electrical signal indicating the presence or absence of the object.

The sensor system is used in an apparatus having a plurality of operating modes. A control unit of the sensor system controls the switching element, causing the light-emitting element to emit light continuously in one operating mode of the apparatus, and in a pulsed manner in another operating mode of said apparatus.

If the apparatus is a video cassette recorder and the object to be sensed is a magnetic tape, continuous light emission can be used in fast-forward and rewind modes for rapid sensing, while pulsed light emission is used in a power-off mode and a power-save mode to save power. Pulsed light emission can also be used in the record, play, and stop modes.

DETAILED DESCRIPTION OF THE INVENTION

The invention can be embodied in a start sensor in a video cassette recorder. Several such embodiments will be described with reference to the attached drawings, in which like parts are indicated by like reference characters.

Figure 3:
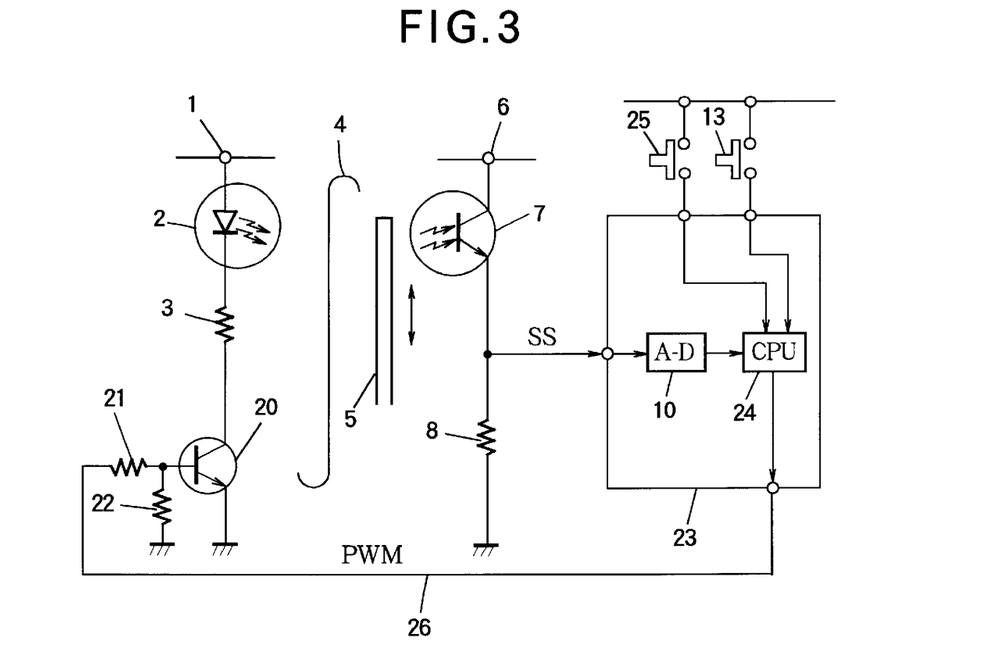
FIG. 3 illustrates the components of a first embodiment of the invention.

Referring to FIG. 3, a first embodiment has power supply nodes 1, 6, an IR-LED 2, a start-sensor slit 5, an infrared phototransistor 7, resistors 3, 8, and a rewind switch 13 similar to the corresponding elements in the conventional sensor system described above. The first embodiment also has a power-switching transistor 20 and a pair of resistors 21, 22. The power-switching transistor 20 is an npn bipolar transistor coupled in series between the resistor 3 and ground. Resistors 21 and 22 are both coupled to the base electrode of the power-switching transistor 20. Resistor 22 is coupled in series between the base electrode and ground.

The first embodiment also has a microcomputer 23 with a CPU 24 that receives inputs from the rewind switch 13 and a power-save switch 25. The power-save switch 25 is used to select a power-save mode of operation. The CPU 24 controls an output port which is coupled by a signal line 26 to resistor 21. The signal output on signal line 26 is a pulse-width modulated or PWM signal that alternates between the high and low levels with a duty cycle programmed by the CPU 24. During normal operation, the CPU 24 sets the duty cycle to one hundred percent, causing the PWM signal to remain high continuously, but during the power-save mode, the CPU 24 sets a lower duty cycle.

The high level of the PWM signal is, for example, five volts (5 V). Resistors 21, 22 form a voltage divider that divides the high level of the PWM signal down to a level suitable for turning on the power-switching transistor 20. When the PWM signal is low, the power-switching transistor 20 is switched off and the IR-LED 2 does not consume current or emit light.

Figure 4:
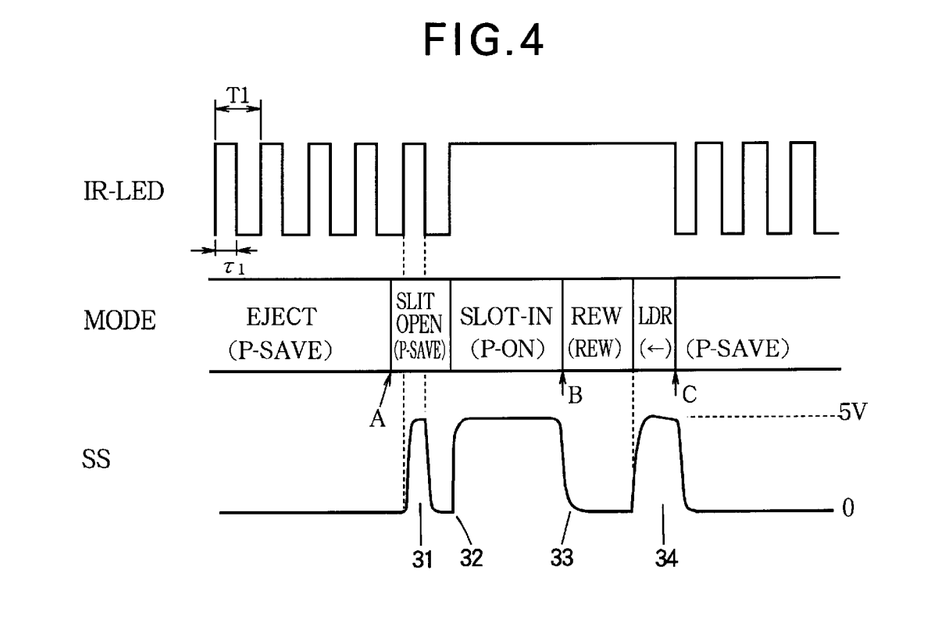
FIG. 4 illustrates the operation of the first embodiment.

The operation of the first embodiment will be described with reference to FIG. 4, which illustrates a load and rewind sequence similar to that described in FIG. 2.

Initially, no cassette is present, the start-sensor slit 5 is closed, and the video cassette recorder operates in the power-save (P-SAVE) mode. In this mode, the PWM signal has a period $T_1$ and pulse width $\tau_1$, being programmed for a duty cycle of $\tau_1/T_1$. The IR-LED 2 emits light during the high pulse intervals of the PWM signal, but since the start-sensor slit 5 is closed, none of this light reaches the phototransistor 7 and the sensor signal SS remains low.

At a time A, the user inserts a fully wound cassette and the start-sensor slit 5 opens. As soon as the PWM signal goes high, turning on the IR-LED 2, the phototransistor 7 receives light and conducts, causing the sensor signal SS to go high. One or more high pulses 31 of the sensor signal SS are produced in this way.

Upon detecting the first of these high pulses 31, the CPU 24 powers up the other circuits of the video cassette recorder, thereby changing from the power-save mode to the power-on (P-ON) mode. In addition, the CPU 24 initiates the slot-in operation, loading the magnetic tape 4 with its transparent leader section facing the start-sensor slit 5, and changes the duty cycle of the PWM signal from $\tau_1/T_1$ to one hundred percent, so that the PWM signal remains high and the IR-LED 2 emits light continuously. Following the next rise 32 of the sensor signal SS, as the transparent leader section at the end of the magnetic tape 4 is loaded into a position between the IR-LED 2 and start-sensor slit 5, the sensor signal SS stays high.

During the slot-in operation, the user presses the rewind switch 13. When the slot-in operation is completed at time B, the CPU 24 initiates a rewinding operation. The opaque magnetic tape 4 now occupies the position between the IR-LED 2 and start-sensor slit 5, causing a falling transition 33 of the sensor signal SS. The sensor signal remains low until the transparent leader section at the beginning of the magnetic tape 4 reaches the position between the IR-LED 2 and start-sensor slit 5. The CPU 24 recognizes the leader tape (LDR) from the resulting high level 34 of the sensor signal SS, and promptly halts the rewinding operation.

After rewinding the magnetic tape 4, at time C, the user presses the power-save switch 25 to return to the power-save mode. The CPU 24 responds by turning off the power supply of the infrared phototransistor 7, powering down various other circuits in the video cassette recorder, and restoring the PWM signal to a $\tau_1/T_1$ duty cycle. Since the infrared phototransistor 7 does not receive power, the sensor signal SS goes low.

In the power-save mode, the IR-LED 2 emits light in pulses, drawing current only when the PWM signal is high. Power dissipation by the IR-LED 2 is thus reduced by a factor of $\tau_1/T_1$, as compared with the conventional sensor system. For example, if the duty cycle is fifty per cent, power dissipation by the IR-LED 2 is reduced by half.

Although sensing of the insertion of the cassette may be slightly delayed from the actual insertion time A, the delay is less than the period $T_1$ of the PWM signal, which is, for example, a fraction of a second. This short delay causes no inconvenience to the user.

In the normal operating mode, there are no such sensing delays, because the IR-LED 2 emits light continuously. In high-speed operations such as rewinding the magnetic tape 4, the microcomputer 23 detects the leader tape promptly and can take timely action, such as stopping the rewinding motor.

Depending on the duty cycle of the PWM signal in the power-save mode, power can be saved even if the IR-LED 2 is driven at the same voltage level (e.g., 5 V) as the infrared phototransistor 7 and microcomputer 23.

Next, a second embodiment will be described. The second embodiment adds a power-off switch and mode to the configuration of the first embodiment.

Figure 5:
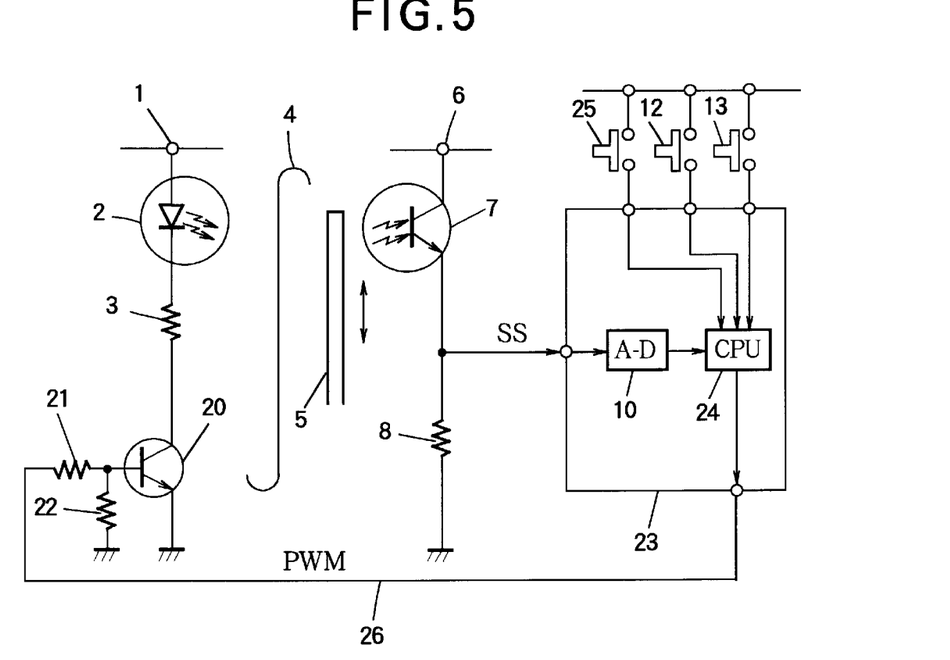
FIG. 5 illustrates the components of a second embodiment of the invention.

Referring to FIG. 5, the second embodiment has the elements described in the first embodiment, and an additional power on-off switch 12. The power on-off switch 12 switches the main power of the video cassette on and off, but even when the main power is switched off, power continues to be supplied to the IR-LED 2 and microcomputer 23, and continues to be supplied to the infrared phototransistor 7 if no cassette is present.

In the power-off mode, as well as in the power-save mode, the CPU 24 sets the PWM signal to a duty cycle less than one hundred percent, to conserve power.

Figure 6:
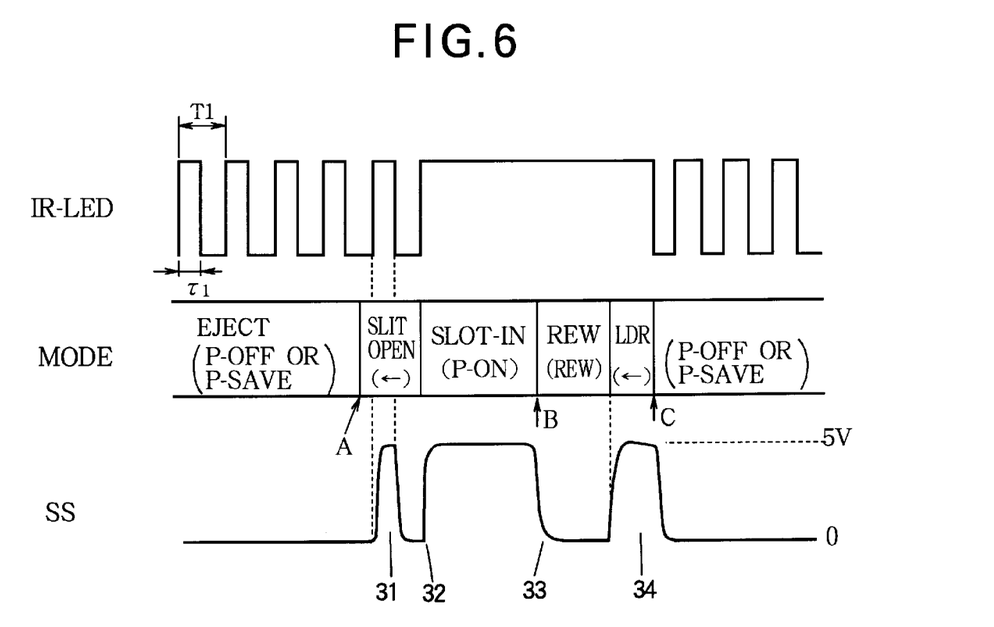
FIG. 6 illustrates the operation of the second embodiment.

FIG. 6 illustrates the operation of the second embodiment during the load and rewind sequence described in the first embodiment. A detailed description will be omitted, because the operation is identical to the operation described in the first embodiment, except that the operation may begin and end in either the power-off or power-save mode. In both of these modes, the IR-LED 2 is driven in a pulsed manner as shown, and its power consumption is reduced by a factor of $\tau_1/T_1$.

The difference between the power-save and power-off modes mainly concerns other parts of the video cassette recorder, not shown in the drawings. By operating the IR-LED 2 in a pulsed manner, the second embodiment reduces power dissipation in both modes.

Next, a third embodiment will be described. The third embodiment further increases the number of modes in which the IR-LED is pulsed.

Figure 7:
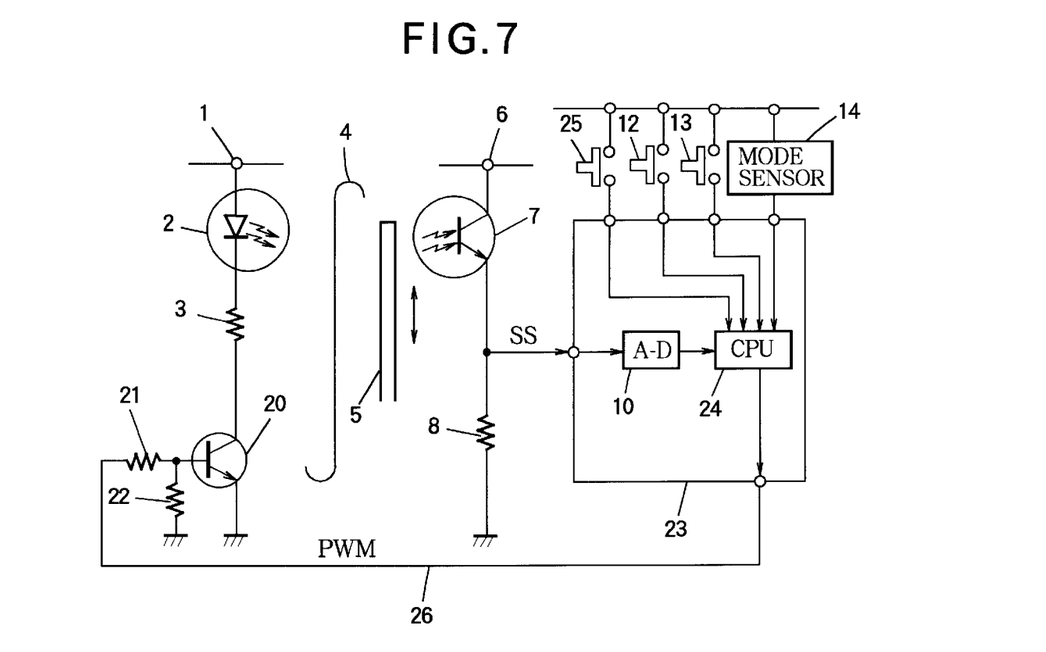
FIG. 7 illustrates the components of a third embodiment of the invention.

Referring to FIG. 7, the third embodiment adds a deck mode sensor 14 to the elements shown in the second embodiment. The deck mode sensor 14 informs the CPU 24 whether the magnetic tape 4 is moving or stopped. The CPU 24 sets the PWM signal to a duty cycle less than one hundred percent in the power-save and power-off modes, and also in the power-on mode when the deck mode sensor 14 indicates that the magnetic tape 4 is stopped.

Figure 8:
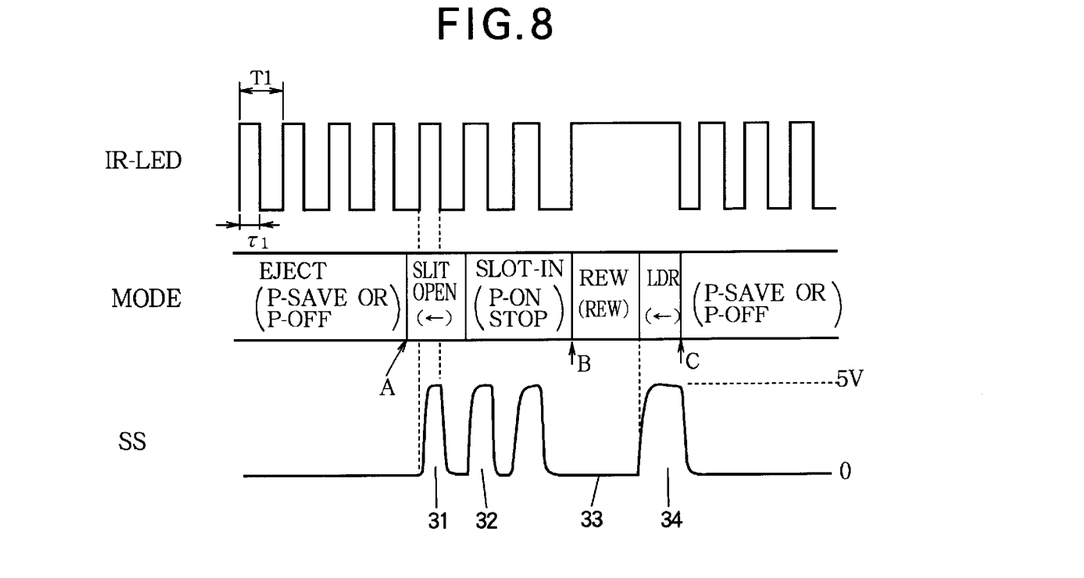
FIG. 8 illustrates the operation of the third embodiment.

FIG. 8 illustrates the operation of the third embodiment in the load and rewind sequence. Initially, the video cassette recorder is in the power-save or power-off mode, the duty cycle of the PWM signal is $\tau_1/T_1$, and the IR-LED 2 is pulsed. At time A, the user inserts a cassette and the start-sensor slit 5 opens. Shortly thereafter, the microcomputer 23 detects a high pulse 31 of the sensor signal SS, and initiates the slot-in operation. During this operation, the deck mode sensor 14 indicates the stop mode, the duty cycle of the PWM signal is left at $\tau_1/T_1$, the IR-LED 2 continues to operate in a pulsed manner, and the microcomputer 23 continues to detect pulses 32 of the sensor signal SS.

At time B, the slot-in operation ends and the rewinding operation begins. The deck mode sensor 14 ceases to indicate the stop mode, so the CPU 24 sets the duty cycle of the PWM signal to one hundred percent, causing the IR-LED 2 to emit light continuously. During the rewinding operation, the light is blocked by the magnetic tape 4, causing a protracted low interval 33 of the PWM signal, until the leader tape (LDR) is reached and the microcomputer 23 detects a high interval 34 of the sensor signal SS. The microcomputer 23 halts the rewinding operation shortly after detecting the leader tape.

At time C, the video cassette recorder reverts to the power-save or power-off mode, the CPU 24 sets the duty cycle of the PWM signal to $\tau_1/T_1$ again, and the IR-LED 2 returns to pulsed operation. Since the cassette is still present, the microcomputer 23 switches off power to the infrared phototransistor 7, and the sensor signal SS goes low.

The third embodiment operates the IR-LED 2 in a continuous manner whenever the magnetic tape 4 is moving. All transitions between the transparent leader tape and the opaque magnetic tape 4 are therefore detected promptly. At other times, the IR-LED 2 operates in a pulsed manner, and its power consumption is reduced by a factor of $\tau_1/T_1$.

Next, a fourth embodiment will be described. The fourth embodiment reduces continuous operation of the IR-LED to the minimum necessary modes.

Figure 9:
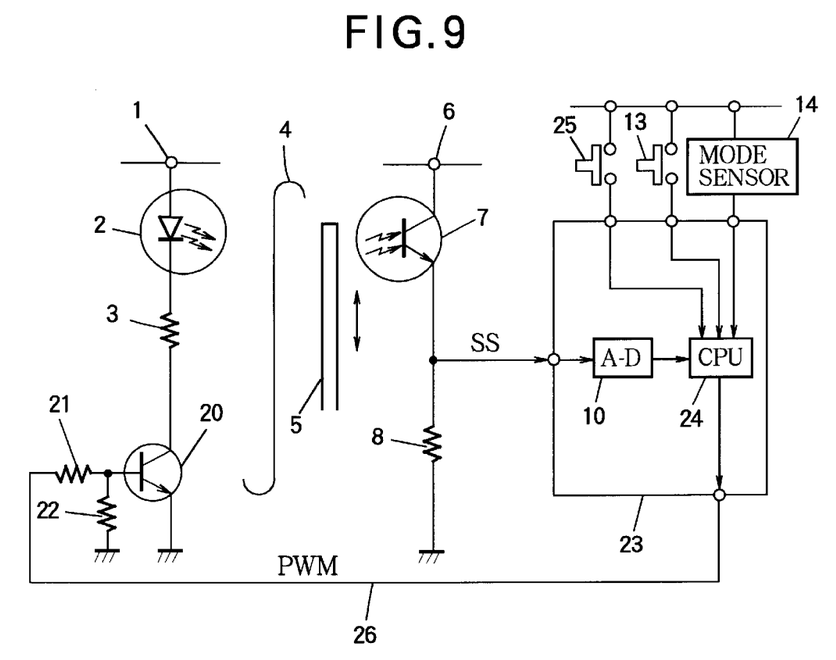
FIG. 9 illustrates the components of a fourth embodiment of the invention.

Referring to FIG. 9, the fourth embodiment adds a deck mode sensor 14 to the configuration of the first embodiment. Differing from the deck mode sensor 14 in the third embodiment, the deck mode sensor 14 in the fourth embodiment indicates whether the magnetic tape 4 is stopped, moving at a low speed, or moving at a high speed. Low-speed tape motion occurs during record and play operations. High-speed tape motion occurs during fast-forward and rewinding operations. The CPU 24 in the fourth embodiment sets the duty cycle of the PWM signal to one hundred percent when the deck mode sensor 14 indicates high-speed tape motion, and to a lower duty cycle ($\tau_1/T_1$) at all other times.

Figure 10:
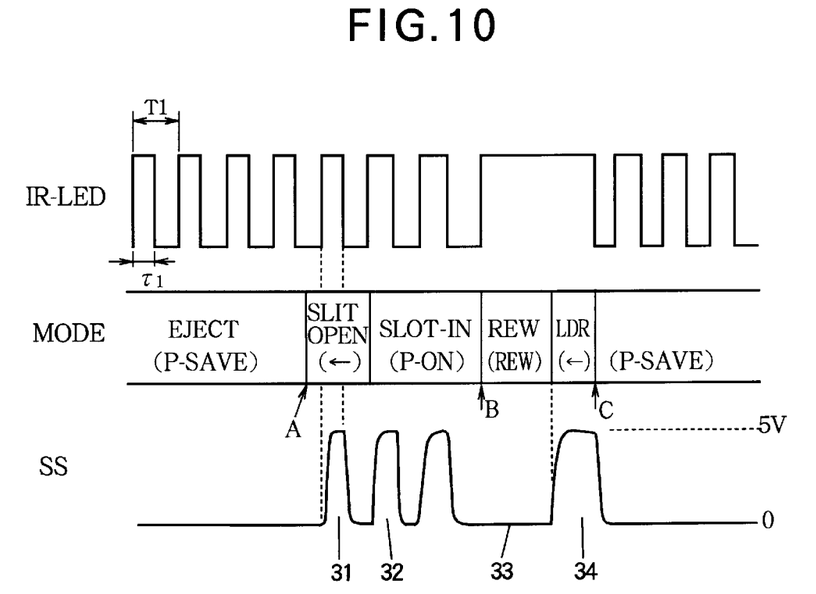
FIG. 10 illustrates the operation of the fourth embodiment.

FIG. 10 illustrates the operation of the fourth embodiment during the load and rewind sequence. Initially, the video cassette recorder is in the power-save mode. The IR-LED 2 is driven in a pulsed manner in this mode, and in the power-on mode from time A to time B. During the rewinding operation from time B to time C, the IR-LED 2 is driven continuously. After the transition from the rewinding mode to the power-save mode at time C, the IR-LED 2 returns to pulsed operation.

The microcomputer 23 needs to be able to sense the leader tape quickly in fast-forward and rewinding operations, but in the lower-speed record and play operations, a certain delay in sensing the leader tape is allowable, provided the leader tape is sensed before the end of the tape is reached. The value of $T_1$ in the fourth embodiment is short enough that the allowable sensing delay is not exceeded.

By operating the IR-LED 2 continuously only during high-speed tape motion, the fourth embodiment reduces power consumption by the IR-LED 2 by a factor of $\tau_1/T_1$ at all other times.

Next, a fifth embodiment will be described. The fifth embodiment reduces the duty cycle of the PWM signal.

Figure 11:
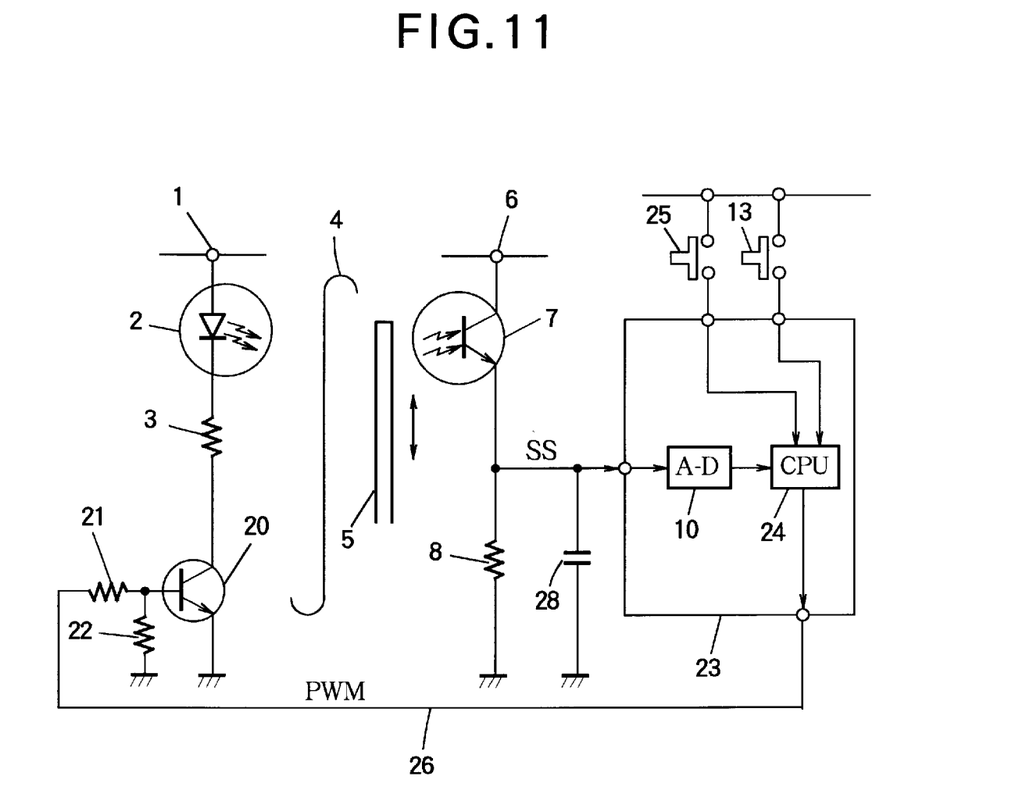
FIG. 11 illustrates the components of a fifth embodiment of the invention.

Referring to FIG. 11, the fifth embodiment adds a capacitor 28 to the configuration of the first embodiment. The capacitor 28 is coupled in series between the emitter electrode of the infrared phototransistor 7 and ground, in parallel with resistor 8. The capacitor 28 charges toward the power-supply potential at node 6 while the infrared phototransistor 7 is switched on, and discharges through resistor 8 toward the ground potential when the infrared phototransistor 7 is switched off. The charging rate is faster than the discharging rate, because the on-resistance of the infrared phototransistor 7 is less than the resistance of resistor 8. The sensor signal SS has a value equal to the potential to which the capacitor 28 is charged.

In the power-save mode, the CPU 24 sets the PWM signal to a duty cycle $\tau_2/T_2$ which is less than the duty cycle $\tau_1/T_1$ employed in the first embodiment. For example, if $\tau_1/T_1$ was fifty percent, then $\tau_2/T_2$ may be twenty-five percent. In other modes, the CPU 24 sets the duty cycle to one hundred percent.

Figure 12:
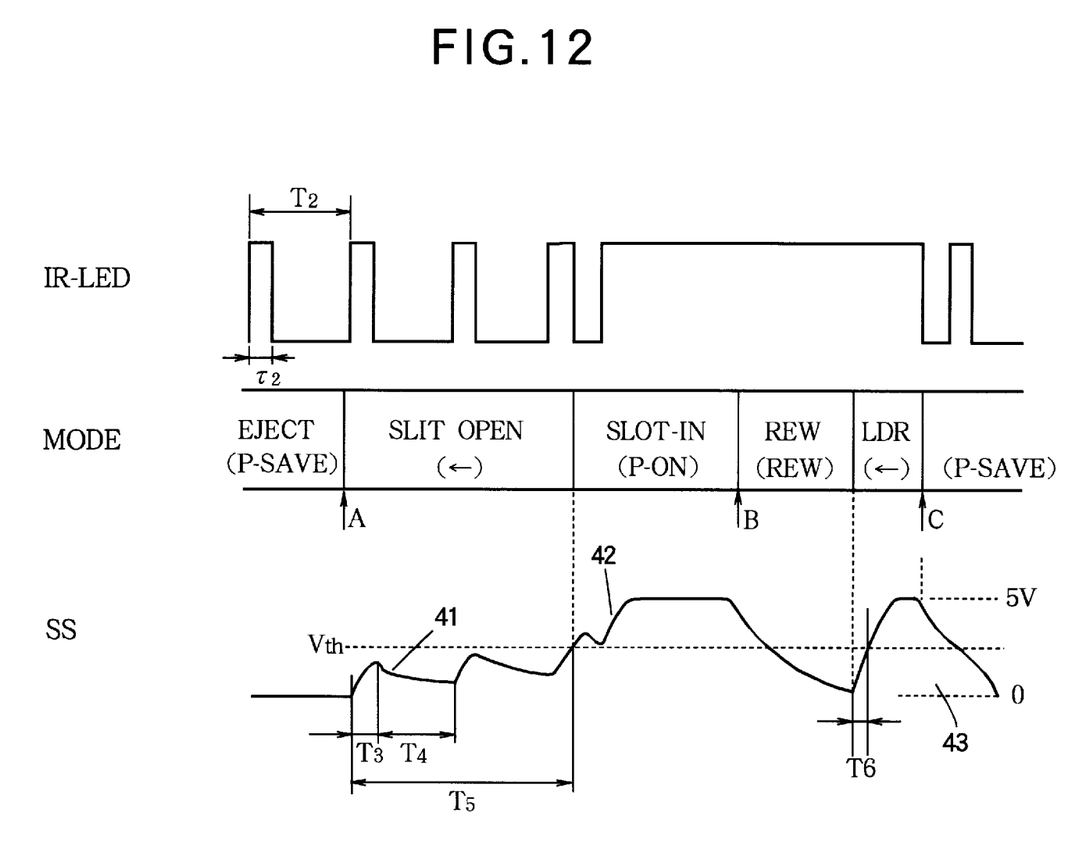
FIG. 12 illustrates the operation of the fifth embodiment.

FIG. 12 illustrates the operation of the fifth embodiment during the load and rewind sequence. Initially, the video cassette recorder is in the power-save mode, and the IR-LED 2 is driven with a duty cycle of $\tau_2/T_2$. The start-sensor slit 5 is closed, and the sensor signal SS is at the ground level (0 V).

At time A, a cassette is inserted and the start-sensor slit 5 opens. Time A happens to coincide with the beginning of a pulse of light emitted by the IR-LED 2. The capacitor 28 charges for the duration $T_3$ of this pulse, but before the sensor signal SS reaches the threshold value (Vth) midway between ground (0 V) and the power-supply potential (5 V), the pulse ends and the capacitor 28 begins to discharge. The voltage of the sensor signal SS gradually falls during the interval $T_4$, until the next pulse of light is emitted by the IR-LED 2. Since the capacitor 28 does not discharge completely during this interval $T_4$, the next light pulse takes the sensor signal SS to a higher voltage level than before.

The sensor signal SS continues to rise and fall in a staircase manner, finally reaching the threshold level Vth after a time $T_5$. The microcomputer 23 is now able to detect the sensor signal SS as being high. When the high level of the sensor signal SS is detected, the power-on mode is entered. The CPU 24 powers up the other circuits of the video cassette recorder, initiates the slot-in operation, and sets the duty cycle of the PWM signal to one hundred percent. The IR-LED 2 now emits light continuously, and the capacitor 28 charges all the say to the power-supply level (5 V).

The time $T_5$ needed to sense the presence of the cassette depends on the duty cycle $\tau_2/T_2$ of the PWM signal and the relative slopes of the discharging curve 41 and charging curve 42 of the capacitor 28. The duty cycle $\tau_2/T_2$ can be set to the minimum value necessary to keep the sensing time $T_5$ within a predetermined limit.

When the rewinding operation begins at time B, the light from the IR-LED 2 is blocked by the magnetic tape 4, the infrared phototransistor 7 switches off, and the capacitor 28 gradually discharges through resistor 8. By the time the leader tape is reached, the capacitor 28 has discharged to the ground level, so a certain time $T_6$ is required for the sensor signal SS to return from zero volts (0 V) to the threshold level Vth. This time $T_6$ depends on the RC time constant of the on-resistance (R) of the infrared phototransistor 7 and the capacitance (C) of the capacitor 28. The capacitance of the capacitor 28 should be selected so that the sensor signal SS reaches the threshold level Vth well before the end of the leader tape is reached, enabling the CPU 24 to halt the rewinding operation within the necessary time.

As shown during the interval $T_5$ in FIG. 12, the capacitor 28 integrates the signals produced by the pulses of light emitted by the IR-LED 2 so that eventually, the sensor signal SS exceeds the threshold level Vth continuously, even though the IR-LED 2 operates in a pulsed manner. Consequently, the operation of the analog-to-digital converter 10 in the microcomputer 23 does not have to be synchronized with the PWM signal. When the cassette is inserted, the analog-to-digital converter 10 can sample the sensor signal SS at arbitrary timings and still be sure of obtaining a high value within a fixed time $T_5$.

With a suitable selection of the capacitance of capacitor 28 and the resistance of resistor 8, the fifth embodiment enables the IR-LED 2 to be driven at a fairly low duty cycle $\tau_2/T_2$ in the power-save mode. Power dissipation by the IR-LED 2 in this mode can thereby be reduced to a lower level than in the preceding embodiments.

Next, a sixth embodiment will be described. The sixth embodiment combines the features of the second and fifth embodiments.

Figure 13:
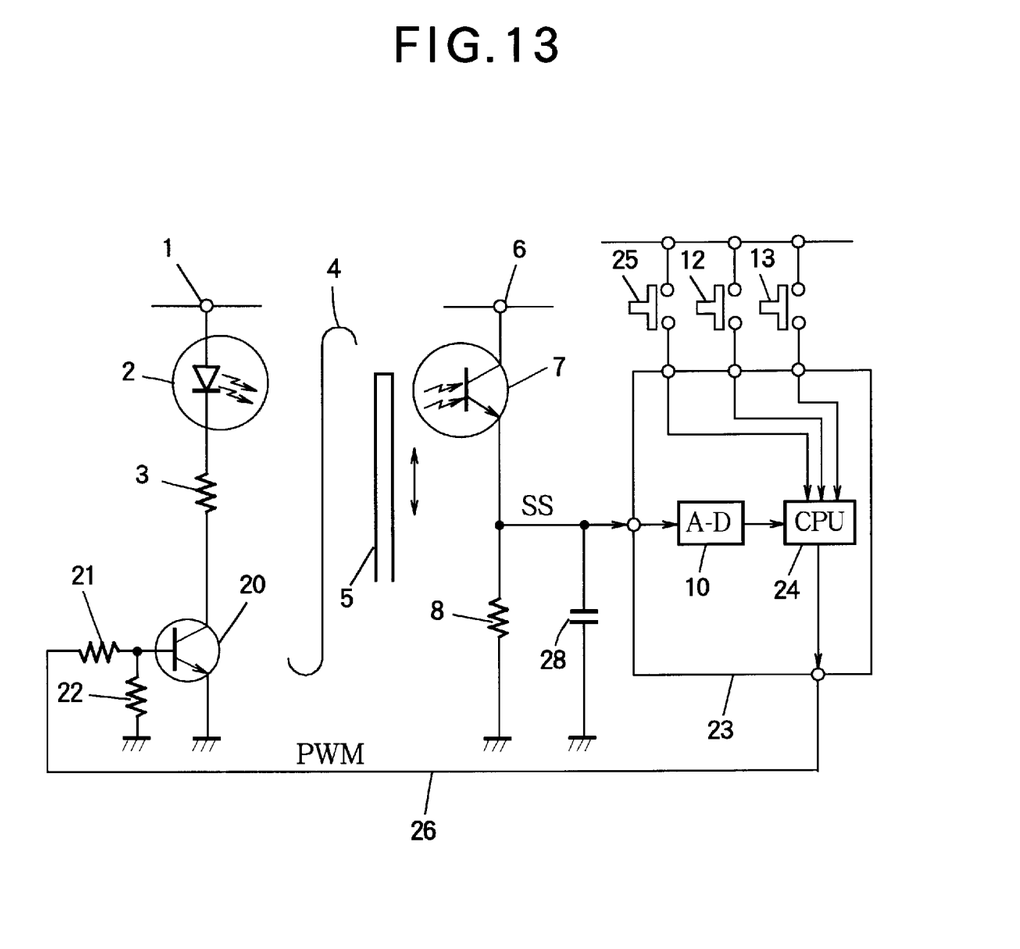
FIG. 13 illustrates the components of a sixth embodiment of the invention.

Referring to FIG. 13, the sixth embodiment adds the capacitor 28 of the fifth embodiment to the configuration shown in the second embodiment, including a power on-off switch 12 and rewind switch 13. The CPU 24 sets the duty cycle of the PWM signal to the comparatively low value $\tau_2/T_2$ described in the fifth embodiment in both the power-save and power-off modes.

Figure 14:
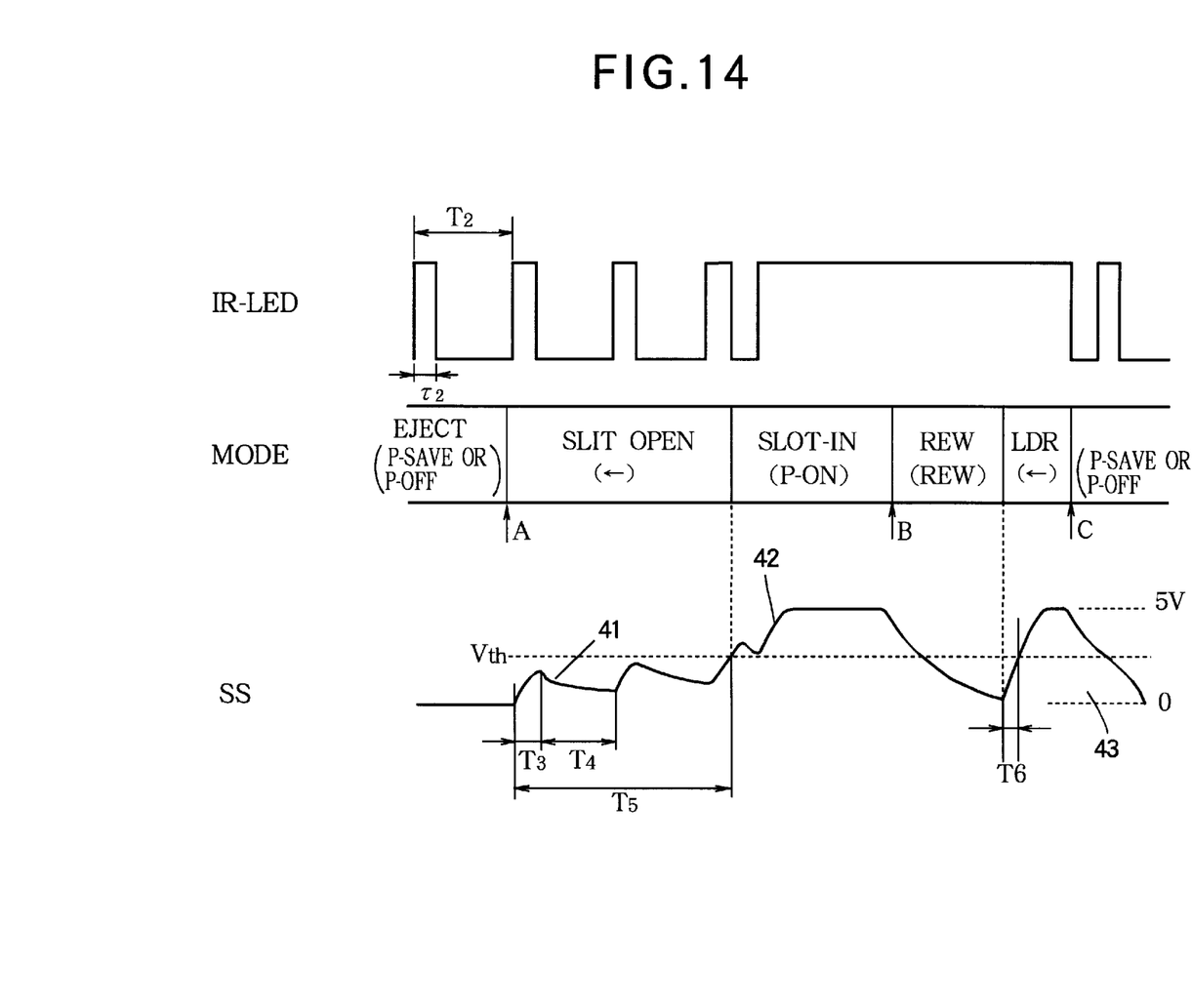
FIG. 14 illustrates the operation of the sixth embodiment.

FIG. 14 illustrates the operation of the sixth embodiment in the load and rewind sequence. This sequence begins and ends in either the power-save mode or the power-off mode. The pulsed optical output waveform of the IR-LED 2 is the same in both modes. The waveform of the sensor signal SS is the same as in the fifth embodiment, so a detailed description will be omitted.

The sixth embodiment extends the power-saving effect described in the fifth embodiment to the power-off mode as well as the power-save mode.

Next, a seventh embodiment will be described. The seventh embodiment combines the features of the third and fifth embodiments.

Figure 15:
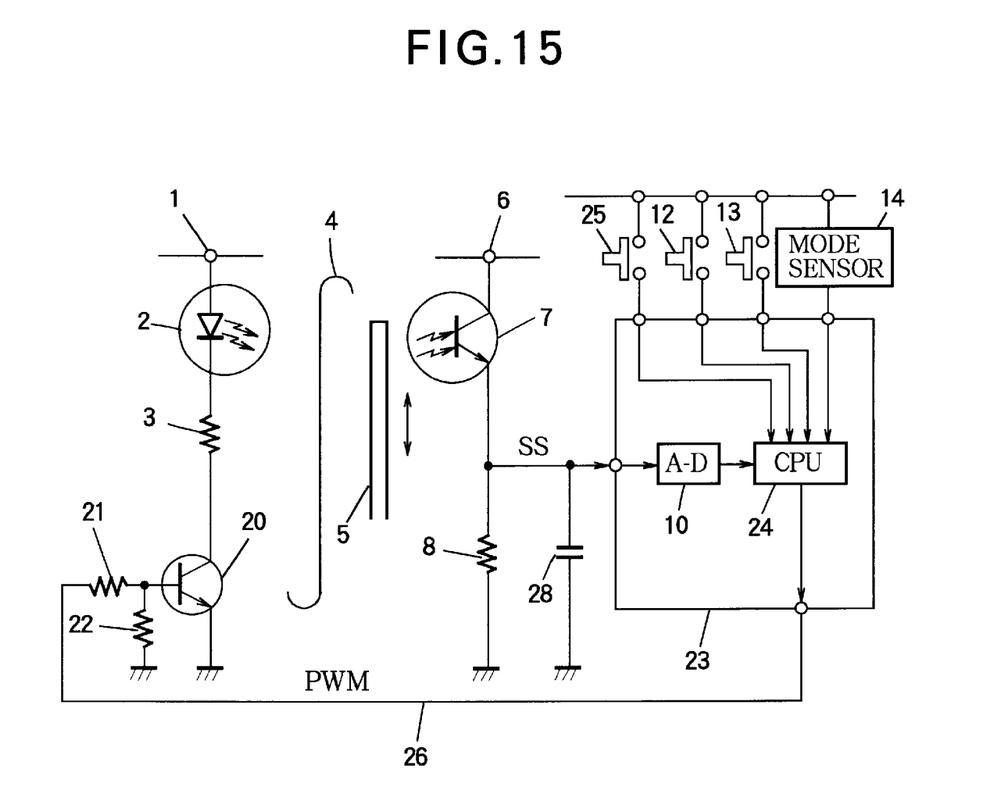
FIG. 15 illustrates the components of a seventh embodiment of the invention.

Referring to FIG. 15, the seventh embodiment adds the capacitor 28 of the fifth embodiment to the configuration shown in the third embodiment, including a power on-off switch 12, a rewind switch 13, and a deck mode sensor 14. The deck mode sensor 14 indicates whether the magnetic tape 4 is moving or stopped. The CPU 24 sets the duty cycle of the PWM signal to the comparatively low value $\tau_2/T_2$ described in the fifth embodiment in the power-save mode, the power-off mode, and the stop mode detected by the deck mode sensor 14.

Figure 16:
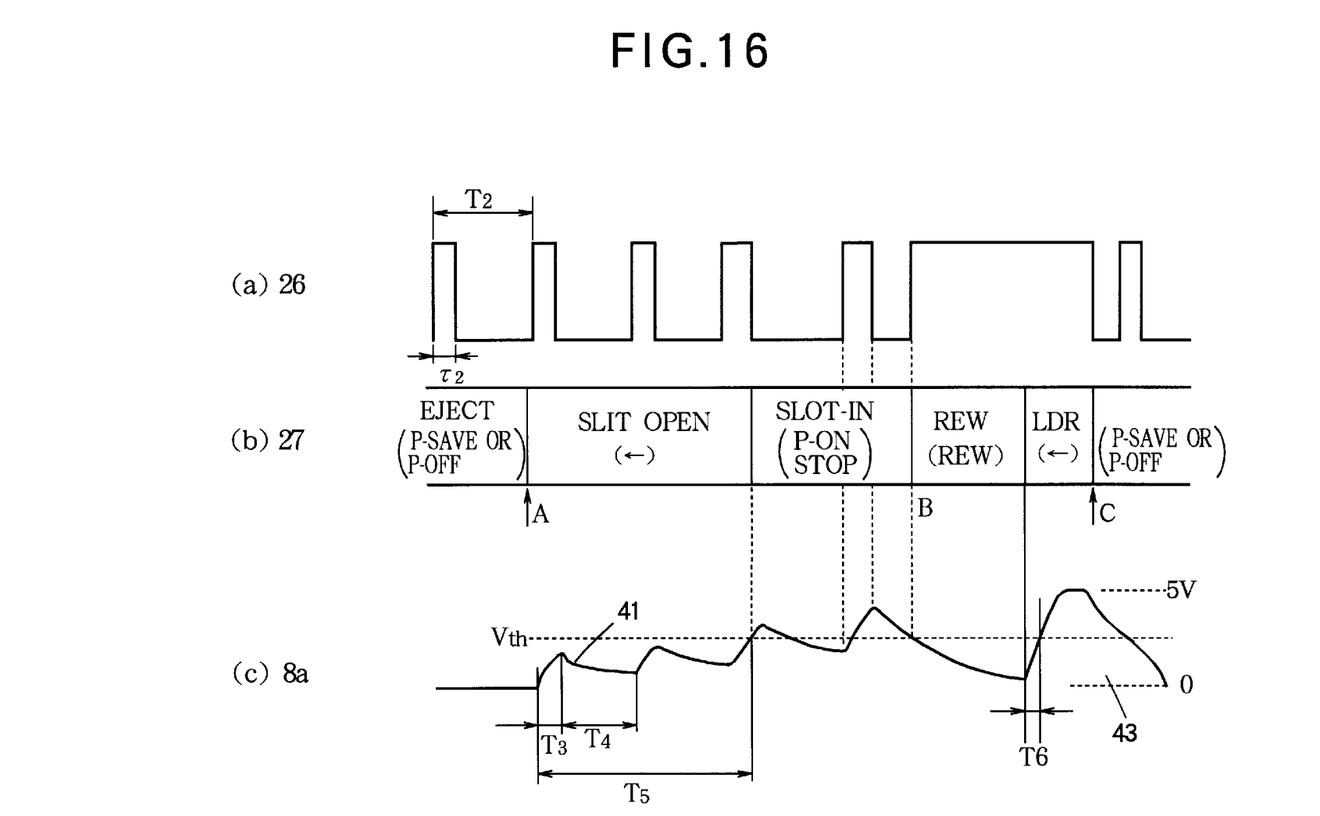
FIG. 16 illustrates the operation of the seventh embodiment.

FIG. 16 illustrates the operation of the seventh embodiment in the load and rewind sequence, beginning and ending in either the power-save mode or power-off mode. The IR-LED 2 continues to operate in a pulsed manner with duty cycle $\tau_2/T_2$ until the magnetic tape 4 starts moving at time B. The start sensing time $T_5$ and the leader-tape sensing time $T_6$ are the same as in the fifth embodiment.

The seventh embodiment extends the power-saving effects of the fifth and sixth embodiments to all times at which the magnetic tape 4 is not moving, regardless of whether the video cassette recorder is in the power-on mode, power-off mode, or power-save mode.

The invention has been described in relation to a start sensor in a video cassette recorder, but can be applied to save power in other sensors, such as mode and reel sensors in a video cassette recorder, or sensors in various other types of apparatus.

Duty cycles of twenty-five and fifty percent were mentioned only as examples; other duty cycles can be used as appropriate.

The threshold voltage Vth for discriminating between the high and low levels of the sensor signal SS need not be a midway between the power-supply and ground voltages. A lower threshold voltage can be employed, provided the presence of the magnetic tape 4 can be reliably detected. Lowering the threshold voltage enables the duty cycle of the PWM signal to be reduced, resulting in further power saving. Use of an analog-to-digital converter 10 in the microcomputer 23 enables the threshold voltage Vth to be set and changed by software. For example, a comparatively low threshold voltage can be used when the IR-LED 2 is being driven in a pulsed manner, and a higher threshold can be used when the IR-LED 2 is driven continuously.

An npn infrared phototransistor 7 was shown in the drawings, but a pnp infrared phototransistor or another type of light-sensing element can be employed instead.

The various operating modes can be selected and detected by means other than the power on-off switch, rewind switch, and deck mode sensor shown in the drawings. For example, the power-save mode can be selected automatically by the microcomputer if no operation is performed for a predetermined period of time.

Those skilled in the art will recognize that further variations are possible within the scope claimed below.

What is claimed is:

1. A sensor system for sensing the presence and absence of an object in an apparatus having a plurality of operating modes, comprising:
   a light-emitting element for emitting light;
   a switching element supplying power to said light-emitting element;
   a light-sensing element receiving the light emitted by said light-emitting element, conditional on the presence of said object, and converting the received light to an electrical signal indicating the presence or absence of said object; and
   a control unit controlling said switching element, thereby causing said light-emitting element to emit light continuously in one operating mode of said apparatus, and causing said light-emitting element to emit light in a pulsed manner in another operating mode of said apparatus;
   wherein said object includes a leading edge which is detected at the moment emitted light from said light-emitting element is no longer received by said light sensing element during an operating mode.

2. The sensor system of claim 1, wherein said apparatus has a power-save mode, and said control unit causes said light-emitting element to emit light in said pulsed manner in said power-save mode.

3. The sensor system of claim 1, wherein said apparatus has a power-off mode, and said control unit causes said light-emitting element to emit light in said pulsed manner in said power-off mode.

4. The sensor system of claim 1, wherein said object is a magnetic recording medium, said apparatus has a stop mode in which said magnetic recording medium does not move, and said control unit causes said light-emitting element to emit light in said pulsed manner in said stop mode.

5. The sensor system of claim 1, wherein said object is a magnetic tape, said apparatus has a fast-forward mode and a rewind mode, and said control unit causes said light-emitting element to emit light continuously in said fast-forward mode and said rewind mode.

6. The sensor system of claim 1, wherein said control unit controls said switching element by supplying a pulse-width modulated signal to said switching element and controlling a duty cycle of said pulse-width modulated signal.

7. The sensor system of claim 1, further comprising a capacitor charged by said electrical signal, holding said electrical signal continuously above a predetermined threshold voltage level while said light-sensing element receives the light emitted by said light-emitting element, even when said light-emitting element emits said light in said pulsed manner.

8. The sensor system of claim 7, further comprising a resistor for discharging said capacitor, said resistor having a higher resistance than said light-sensing element, said capacitor thus charging more rapidly than discharging.

9. The sensor system of claim 1, wherein the light-sensing element is aligned with said light-emitting element and said object.

10. A method of sensing the presence and absence of an object in an apparatus having a plurality of operating modes, comprising the steps of:
    driving a light-emitting element continuously in one of said operating modes;
    driving said light-emitting element in a pulsed manner in another one of said operating modes;
    receiving light emitted by said light-emitting element by a light-sensing element, conditional on the presence of said object; and
    converting the received light to an electrical signal indicating the presence or absence of said object;
    wherein said object includes a leading edge which is detected at the moment emitted light from said light-emitting element is no longer received by said light sensing element during an operating mode.

11. The method of claim 10, wherein said apparatus has a power-save mode, and said light-emitting element is driven in said pulsed manner in said power-save mode.

12. The method of claim 10, wherein said apparatus has a power-off mode, and said light-emitting element is driven in said pulsed manner in said power-off mode.

13. The method of claim 10, wherein said object is a magnetic recording medium, said apparatus has a stop mode in which said magnetic recording medium does not move, and said light-emitting element is driven in said pulsed manner in said stop mode.

14. The method of claim 10, wherein said object is a magnetic tape, said apparatus has a fast-forward mode and a rewind mode, and said light-emitting element is driven continuously in said fast-forward mode and said rewind mode.

15. The method of claim 10, further comprising the steps of:
    supplying a pulse-width modulated signal to a switching element coupled to said light-emitting element; and
    setting a duty cycle of said pulse-width modulated signal to one hundred percent to carry out said step of driving said light-emitting element continuously, and to a lower duty cycle to carry out said step of driving said light-emitting element in said pulsed manner.

16. The method of claim 10, further comprising the step of charging a capacitor by said electrical signal while said light is received, thereby holding said electrical signal continuously above a predetermined threshold voltage level while said light is received, even when said light-emitting element is driven in said pulsed manner.

17. The method of claim 16, further comprising the step of discharging said capacitor through a resistor while said light is not received, said step of discharging proceeding at a slower rate than said step of charging.

18. The method of claim 10, wherein the light-sensing element is aligned with said light-emitting element and said object.

19. An apparatus for determining whether a data medium is present for performing an operation in one of a plurality of operating modes, comprising:

a light emitter that emits a continuous beam of light in a first operating mode and a pulsed beam of light in a second operating mode;

a switching element that supplies power to said light emitter;

a sensor slit which opens to emit light from said light emitter toward a light sensor when a data medium is present, the light emitter, data medium, sensor slit and light sensor being linearly aligned and said data medium and sensor slit being located between said light emitter and said light sensor.

* * * * *